March 9, 1943.   J. F. O'BRIEN   2,313,452
MULTIPLE CONDUCTOR ELECTRIC WIRING UNIT
Filed Sept. 10, 1940
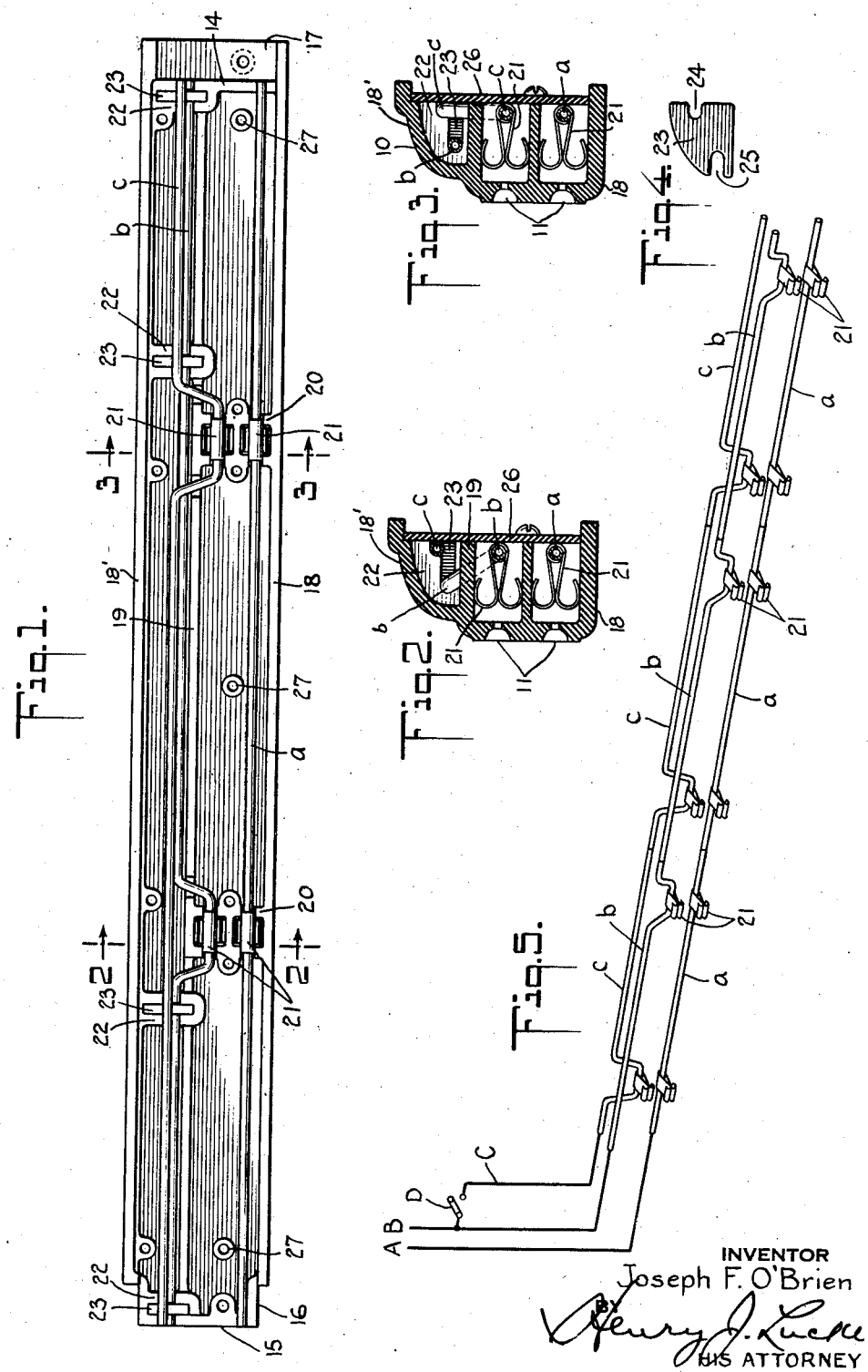
INVENTOR
Joseph F. O'Brien
HIS ATTORNEY Patented Mar. 9, 1943

2,313,452

UNITED STATES PATENT OFFICE 2,313,452

MULTIPLE CONDUCTOR ELECTRIC WIRING UNIT

Joseph F. O'Brien, Jersey City, N. J., assignor to John B. Pierce Foundation, New York, N. Y., a corporation of New York Application September 10, 1940, Serial No. 356,153

1 Claim. (Cl. 173—334.1)

This invention relates to improved wiring systems.

In particular, the invention relates to a wiring system comprising standardized conductor units arranged for seriatim mechanical and electrical interconnection, one or more of said interconnected units having a plurality of electrical outlet means affording, optionally, connection with a continuously alive electrical circuit or one which is switch-controlled.

It is an object of the invention to provide an electrical conductor unit embodying a plurality of electricity conductors, pairs of said plurality of conductors within said unit being so related as to afford either a switch controlled or continuously live electrical status.

It is an object of the invention to provide an electricity conductor unit having a plurality of electric outlet means, said plurality of electric outlet means being so arranged as to afford connection of an electric fixture, optionally, to a continuously live electric circuit or to a circuit which is under the control of a local switch.

An electrical wiring system embodying the present invention is characterized by interconnected conductor-carrying units having three conductors, two of the conductors of such units connecting directly to the live and return wires of a conventional two wire electric power source and hence being in continuously live status, and a third conductor of the unit being connected to the return wire of the power source through the agency of an intermediate switch, whereby said third conductor may be wholly disconnected from said power source.

The electric units forming the instant invention are provided with electrical outlet means; one of the contacts of the outlet means is in electrical contact with one of the continuously live conductors. The remaining conductors within the unit are provided, alternately, with electrical contact means operatively associated with the contact means of the first mentioned conductor and arranged in conformity with the standard spacing of the blades of a conventional attachment plug.

Preferably, the conductor units embodying the present invention are made in sixteen inch lengths, to facilitate the attaching of the units to wall studding spaced sixteen inches on centers. Within such sixteen inch length, two outlets are provided, and it is apparent, therefore, that by suitable arrangement of the conductors within the unit, a wiring unit may have outlet means providing continuously live circuit status or switch-controlled status and in an electric wiring system embodying a plurality of interconnected conductor units, the outlets of such wiring system may be, alternately, continuously live or switch-controlled.

Other features and advantages will hereinafter appear.

In the accompanying drawing:

Fig. 1 is a rear view of an electrical conductor unit embodying the present invention, the rear cover plate of said unit having been eliminated, to reveal a suitable arrangement of conductors therein;

Fig. 2 is a sectional elevation of an electrical conductor unit taken on lines 2—2 of Fig. 1, showing one arrangement of outlet connections;

Fig. 3 is a sectional elevation of an electrical conductor unit taken on lines 3—3 of Fig. 1, showing a second arrangement of outlet connections;

Fig. 4 is an elevation of a spacer member for the conductors of a unit; and

Fig. 5 is a schematic representation of the electricity conductors of three interconnected conductor units, showing the relationship of said conductors, the outlet contact means thereof, and the electrical system of a building in which the units are placed.

Referring first to Fig. 5, a conventional two wire wiring system includes a hot wire A and a return wire B. Electrically interconnected with said hot wire A are the conductors a, a, a of a plurality of electricity conductor units embodying the present invention; electrically connected with return wire B, and mutually electrically interconnected, are the conductors b, b, b, of said interconnected units.

A third wire C of the electrical feed circuit is electrically interconnected, through the agency of a switch D, to the return wire B of the principal circuit; a third conductor c of each of the trio of conductor carrying units is electrically interconnected, and the conductor c of the first unit is electrically connected to said wire C of the electrical circuit.

It follows, therefore, that an electrical attachment electrically connected across the conductors a, b, of any of the units will be in electrical association with the continuously energized hot and return wires A, B, of the electrical wiring system. Pursuant to this arrangement, an electrical accessory of the nature of an electric clock or other device intended for continuous operation may be so connected.

It follows, also, that an electrical attachment electrically connected across the conductors $a$, $c$, will be in live status only when the switch D is closed, for it is apparent that said conductors $c$ are electrically connected to the return wire B of the electric system only in the circumstance of the closure of switch D. Accordingly, an electrical accessory such as a floor lamp or the like may be connected across conductors $a$, $c$, and may be controlled in its instants of operation by a switch D, which may be placed convenient to an entrance of a room in which the electrical circuit is located.

Referring now to Fig. 1, an electric conductor unit embodying the present invention includes a body 10, formed preferably of electrical insulation material of the nature of molded plastic, and preferably given a configuration adapting the unit for use as a molding strip at a base board of a room or the like. The said body is provided with a plurality, desirably two, of pairs of apertures 11, suitably spaced and sized according to the standardized spacing and size of the blades of an electrical attachment plug. The said body is substantially hollow; transverse end wall means 14, 15 are so arranged as to define a male end 16 and a female socket 17, whereby contiguous units may be serially interconnected. A side wall 18 and an inner longitudinal wall 19 cooperate with walls 20 to form insulating pockets within which the electrical contact members 21, 21 are insulatedly housed in registry with the stated apertures 11, 11.

Wall 19 and side wall 18' form, see Fig. 2, a relatively narrow longitudinal chamber substantially coextensive with the unit, within which chamber conductors of the same polarity are housed, as later described. Transverse walls 22 provide insulating pockets accommodating conductor spacers 23, see Fig. 4, of electrical insulation material.

The respective conductors $a$, $b$, $c$, are suitably arranged within the body of the units in such manner that they present, at each end of the units, a standard arrangement whereby each of the respective conductors of each interconnected unit are in mutual registry. Most preferably, the stated conductors $a$, $b$, $c$, are tubular, whereby electrical interconnection of the respective conductors of adjacent units may be effected by metallic pins inserted into the ends of contiguous conductors and in frictional engagement therewith.

According to one manner of arrangement of such conductors at the ends of the units, conductors $a$ and $c$ are disposed adjacent the base or inside portion of the unit, as shown in Fig. 2, whereas conductor $b$ is disposed forwardly of conductor $c$, as shown in Fig. 3. To maintain the conductors in such preferred alignment, the end walls 14, 15 of the units are suitably notched to receive the said conductors. Similarly, the intermediate transverse walls 22 are notched in registry with the notches of the transverse walls 14, 15, insofar as respects the conductors $b$ and $c$, which are of the same polarity and arranged within the said longitudinal chamber. Conductor spacer members 23 are provided with notches 24, 25, conforming to the notches of the transverse walls 22. When said spacers 23 are inserted into the pockets formed by the walls 22, the open ended notch 25 cooperates with the deep notch of said transverse wall to form a circular aperture through which conductor $b$ passes, and notch 24 forms an aperture through which conductor $c$ passes. A base plate 26 of fiber or the like is arranged to be secured to the body 10, as by the illustrated machine screws which may project into suitably tapped bosses 27 formed in the body 10. The base plate serves to confine the spacers 23 and to hold the conductors $a$, $b$, $c$, in position.

It is noted from Figs. 1 through 3 that conductors $b$ and $c$ may be brought alternately into juxtaposition with conductor $a$, and, therefore, a contact 21 associated with said conductors $b$ and $c$ is arranged in operative association with the contact 21 of conductor $a$. To bring the stated conductor $b$ and conductor $c$ into desired association with conductor $a$ at the base of the conductor units, thus to provide a depth of contact 21 suitable for use with the blades of an attachment plug, the stated conductors are offset. As illustrated in Fig. 2, conductor $b$ is brought angularly downwardly to a position adjacent the base member 26, then is returned to its normal position within the body whence it continues without further offset throughout the body of the unit. Likewise, conductor $c$ is offset at the other of the outlet connection zones to be brought into suitable adjacency with conductor $a$.

From the foregoing it appears that of the two provisions for outlet connections in a unit, one of the outlet connections provides for continuously alive electric circuit, whereas the second of the outlet means is so electrically connected as to render it possible to control flow of electric current thereto by operation of an electric switch arranged remote from the stated conductor unit.

Whereas I have described my invention by reference to specific forms thereof, it will be understood that many changes and modifications may be made without departing from the spirit of the invention.

I claim:

As a new article of manufacture, an electricity conductor unit having three electricity conductors, two conductors of which are arranged for connection to one wire of a two-pole electric circuit, and a third conductor arranged for connection to a second wire of said circuit; said conductor unit comprising a substantially hollow housing, a face of said housing having a plurality of pairs of openings adapted to receive the blades of a two-blade electrical attachment plug, said pairs of openings being remote from each other but in mutual alignment; a wall extending longitudinally within said housing and forming a chamber which is remote from said pairs of openings; the two conductors for connection to the first-named wire of the circuit being disposed within said chamber and extending substantially continuously therein, each of said two conductors being offset for a fraction of its length to be brought adjacent an opening of one of said pairs of openings, and each said conductor having contact means in registry with the respective opening; and the third conductor extending longitudinally within said housing remote from said chamber and having contact means in registry with the remaining opening of each of said pairs of openings, whereby each of the two commonconnected conductors individually cooperates with the third conductor at one of the pairs of openings to provide two distinct two-pole tapping points.

JOSEPH F. O'BRIEN.